US010607332B2

(12) United States Patent
Olson et al.

(10) Patent No.: US 10,607,332 B2
(45) Date of Patent: *Mar. 31, 2020

(54) STONE SLAB MANUFACTURING METHODS AND SYSTEMS

(71) Applicant: Cambria Company LLC, Eden Prairie, MN (US)

(72) Inventors: Eric Scott Olson, Excelsior, MN (US); Brian R. Scoggin, Prior Lake, MN (US); Arthur S. Hartman, II, New Prague, MN (US); Leslie Brey, St. Peter, MN (US); Martin E. Davis, Excelsior, MN (US)

(73) Assignee: Cambria Company LLC, Eden Prairie, MN (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/460,900

(22) Filed: Mar. 16, 2017

(65) Prior Publication Data

US 2017/0186149 A1 Jun. 29, 2017

Related U.S. Application Data

(63) Continuation of application No. 14/978,587, filed on Dec. 22, 2015, now Pat. No. 9,613,412.
(Continued)

(51) Int. Cl.
*G06T 7/00* (2017.01)
*G06F 16/51* (2019.01)
(Continued)

(52) U.S. Cl.
CPC .............. *G06T 7/0004* (2013.01); *B24B 7/22* (2013.01); *G06F 16/51* (2019.01);
(Continued)

(58) Field of Classification Search
CPC ..................... G06T 7/0004; G06T 7/90; G06T 2207/30164; G06T 2207/30132;
(Continued)

(56) References Cited

U.S. PATENT DOCUMENTS

| 178,308 A | 6/1876 | Leathers et al. |
| 1,212,331 A | 1/1917 | Denivelle |

(Continued)

FOREIGN PATENT DOCUMENTS

| CN | 102050598 | 5/2011 |
| EP | 0239143 | 9/1987 |

(Continued)

OTHER PUBLICATIONS

Extended European Search Report issued in European Application No. 16880022.5, dated Oct. 22, 2018, 8 pages.
(Continued)

*Primary Examiner* — Manav Seth
(74) *Attorney, Agent, or Firm* — Fish & Richardson P.C.

(57) ABSTRACT

This document describes systems and processes manufacturing and distributing stone slabs, such as including distributing a stone slab and a slab image file associated with the stone slab. The slab image file may include an image and associated information to facilitate one or more operations related to the stone slab.

23 Claims, 6 Drawing Sheets

Related U.S. Application Data

(60) Provisional application No. 62/270,236, filed on Dec. 21, 2015.

(51) Int. Cl.
*G06F 16/58* (2019.01)
*G06Q 10/08* (2012.01)
*G06Q 10/06* (2012.01)
*G06T 7/90* (2017.01)
*B24B 7/22* (2006.01)
*G06Q 50/08* (2012.01)

(52) U.S. Cl.
CPC ......... *G06F 16/5866* (2019.01); *G06Q 10/06* (2013.01); *G06Q 10/08* (2013.01); *G06T 7/90* (2017.01); *G06Q 50/08* (2013.01); *G06T 2207/30164* (2013.01)

(58) Field of Classification Search
CPC ................ G06F 16/51; G06F 16/5866; G06F 17/30268; B24B 7/22; G06Q 10/06; G06Q 10/08; G06Q 50/08
See application file for complete search history.

(56) References Cited

U.S. PATENT DOCUMENTS

| | | |
|---|---|---|
| 1,474,817 A | 11/1923 | Fincke |
| 1,485,810 A | 3/1924 | Parker, Jr. et al. |
| 1,568,070 A | 1/1926 | Jennens |
| 1,570,538 A | 1/1926 | Thomas |
| 1,711,701 A | 5/1929 | Speck |
| 2,280,488 A | 4/1942 | Jenkins et al. |
| 3,013,370 A | 12/1961 | Vida |
| 3,164,647 A | 1/1965 | Fischler |
| 3,177,279 A | 4/1965 | Bilodeau |
| 3,245,129 A | 4/1966 | Entz |
| 3,245,648 A | 4/1966 | Johansson et al. |
| 3,628,766 A | 12/1971 | Hartmann |
| 3,670,060 A | 6/1972 | Cuffaro et al. |
| 3,712,825 A | 1/1973 | Yocum |
| 3,743,235 A | 7/1973 | Shelley |
| 3,819,436 A | 6/1974 | Allen |
| 3,843,089 A | 10/1974 | Scholz et al. |
| 3,904,791 A | 9/1975 | Iverson et al. |
| 4,094,941 A | 6/1978 | Manners et al. |
| 4,223,346 A | 9/1980 | Neiheisel et al. |
| 4,254,077 A | 3/1981 | Fontana et al. |
| 4,680,155 A | 7/1987 | Rochefort et al. |
| 4,914,870 A | 4/1990 | Toncelli |
| 5,022,193 A | 6/1991 | Toncelli |
| 5,080,085 A | 1/1992 | Lovato |
| 5,662,847 A | 9/1997 | Uchida et al. |
| 5,670,007 A | 9/1997 | Toncelli |
| 5,679,298 A | 10/1997 | Uchida et al. |
| 5,813,183 A | 9/1998 | Attley |
| 6,205,727 B1 | 3/2001 | Toncelli |
| 6,237,294 B1 | 5/2001 | Rygiel |
| 6,461,552 B1 | 10/2002 | Geiger |
| 6,535,294 B1 | 3/2003 | Alredge, Jr. et al. |
| 6,572,802 B1 | 6/2003 | Austin |
| 6,757,582 B2 | 6/2004 | Brisson et al. |
| 7,241,981 B2 | 7/2007 | Hofmann |
| 7,565,221 B2 | 7/2009 | Fischer et al. |
| 7,771,680 B2 | 8/2010 | Gordienko |
| 7,806,029 B2 | 10/2010 | Rozot et al. |
| 7,815,827 B2 | 10/2010 | Cruz |
| 7,877,163 B2 | 1/2011 | Fischer et al. |
| 7,909,241 B2 | 3/2011 | Stone et al. |
| 8,030,441 B2 | 10/2011 | Toncelli |
| 8,101,113 B2 | 1/2012 | Castonguay et al. |
| 8,117,558 B2 | 2/2012 | Hoguet |
| 8,158,548 B2 | 4/2012 | Di Noto et al. |
| 8,333,916 B2 | 12/2012 | Jamrussamee et al. |
| 8,398,954 B2 | 3/2013 | Gordienko |
| 8,402,868 B2 | 3/2013 | Rozot et al. |
| 8,636,941 B1 | 1/2014 | Ciuperca |
| 8,743,137 B2 | 6/2014 | Peters et al. |
| 9,019,266 B2 | 4/2015 | Hoguet |
| 9,047,520 B2 | 6/2015 | Honeck et al. |
| 9,186,819 B1 | 11/2015 | Grzeskowiak, II et al. |
| 9,613,412 B1 * | 4/2017 | Olson ................ G06F 16/51 |
| 2004/0032044 A1 | 2/2004 | Toncelli |
| 2004/0236634 A1 | 11/2004 | Ruuttu |
| 2005/0004783 A1 | 1/2005 | Carey |
| 2005/0013991 A1 | 1/2005 | Yang |
| 2005/0199111 A1 | 9/2005 | Sandberg et al. |
| 2006/0016957 A1 | 1/2006 | Hofmann |
| 2006/0221417 A1 | 10/2006 | Fujieda et al. |
| 2007/0216058 A1 | 9/2007 | Carreras-Maldonado et al. |
| 2007/0241013 A1 | 10/2007 | Alpert et al. |
| 2007/0282718 A1 | 12/2007 | Morgan et al. |
| 2008/0113123 A1 | 5/2008 | Izzo |
| 2008/0153688 A1 | 6/2008 | Borens et al. |
| 2009/0070238 A1 | 3/2009 | Moryto |
| 2009/0070273 A1 | 3/2009 | Moryto |
| 2010/0159220 A1 | 6/2010 | Toncelli |
| 2010/0194005 A1 | 8/2010 | Toncelli |
| 2011/0034586 A1 | 2/2011 | Buskila et al. |
| 2011/0283859 A1 | 11/2011 | Codemo |
| 2012/0003453 A1 | 1/2012 | Buskila et al. |
| 2012/0183735 A1 | 7/2012 | Moreno et al. |
| 2013/0130036 A1 | 5/2013 | Bettiol et al. |
| 2013/0196251 A1 | 8/2013 | Di Noto et al. |
| 2013/0245156 A1 | 9/2013 | Buskila et al. |
| 2013/0262344 A1 | 10/2013 | Ritota et al. |
| 2015/0161695 A1 | 6/2015 | Koby et al. |

FOREIGN PATENT DOCUMENTS

| | | |
|---|---|---|
| WO | WO1994028397 | 12/1994 |
| WO | WO2006100706 | 9/2006 |
| WO | WO2007080059 | 7/2007 |
| WO | WO2008015596 | 2/2008 |
| WO | WO2009010406 | 1/2009 |

OTHER PUBLICATIONS

International Preliminary Report on Patentability issued in International Application No. PCT/US2016/068000, dated Jul. 5, 2018, 12 pages.

International Search Report and Written Opinion issued in International Application No. PCT/US2016/068000, dated Mar. 16, 2017, 15 pages.

"Cambria introduces the new costal collection," [press release] Feb. 4, 2014, 2 pages.

"Slabsmith Manufacturer's Overview." Retrieved from the Internet: <URL: www.slabsmith.com/Manufacturer/Overview>, 3 pages, archived Sep. 18, 2014.

Mapastone, "Mapascan." Retrieved from the internet: <URL: http://www.mapastone.com/wp-content/uploads/2012/09/depliant-mapascan-2012.pdf>, 16 pages, 2012.

Breton—"Bretonstone Slabs—Plants for manufacturing engineered stone slabs and tiles"—Jan. 11, 2014 (Wayback Machine Date)—pp. 4 (webpage where matter can be found—http://web.archive.org/web/20100111015935/http:/www.breton.it/engineerdstone/en/product/Plants_for_manufacturing_compound_stone/bretonstone%c2%ae_slabs).

* cited by examiner

STONE SLAB MANUFACTURING METHODS AND SYSTEMS

CROSS-REFERENCE TO RELATED APPLICATIONS

This application is a continuation of U.S. application Ser. No. 14/978,587, filed on Dec. 22, 2015, which claims priority to U.S. Application Ser. No. 62/270,236, filed on Dec. 21, 2015, which are fully incorporated herein by reference.

TECHNICAL FIELD

This document describes processes and systems for manufacturing and providing a stone slab in conjunction with, for example, a digital image representation of the stone slab.

BACKGROUND

Stone slabs are a commonly used building material. Granite, marble, soapstone, and other quarried stones are often selected for use as countertops, tables and floors. Engineered stone slabs may be formed from a man-made combination of materials that can provide improved aesthetic characteristics and stain-resistant or heat-resistant properties. Quarried and engineered stone slabs are typically cut to a desired size and shape prior to installation.

Digital representations of stone slabs may be used to facilitate or automate selection and cutting. For example, digital representations of stone slabs have been used by slab fabricators and installers to facilitate modeling of a project and/or cutting stone slabs as needed for a particular installation.

SUMMARY

Some embodiments described herein include systems and methods of manufacturing and distributing stone slabs suitable for use in living or working spaces (e.g., along a countertop, table, floor, or the like). Exemplary systems and methods may include generating a high resolution image and metadata related to a stone slab at the time of manufacture that can be used in subsequent fabrication, quality assurance, or other activities, and providing the image and stone slab to a remote party. The image and associated metadata may also facilitate efficient and/or automated selection and matching of stone slabs without requiring physical manipulation of a stone slab and with limited human review of multiple images.

Particular embodiments described herein include an exemplary method of manufacturing and distributing stone slabs and corresponding images of the stone slabs. The method may include manufacturing a stone slab, and assigning a unique identifier associated with the stone slab. The method may also include providing a slab image file associated with the stone slab to a remote party. The slab image file may include a high resolution image of the stone slab and image metadata indicative of characteristics of the stone slab, and the image metadata of the slab image file may include the unique identifier and a predetermined dimensional relationship. For example, the predetermined dimensional relationship provided by the slab image file may include a ratio of stone slab unit length per image pixel, and optionally, the ratio may be substantially consistent at any location of the image.

In some implementations, the method can optionally include one or more of the following features. The method may include providing the stone slab to the remote party. The method may include storing the slab image file in a database. The step of providing the slab image file to the remote party may include granting the remote party access to the database. The method may include assigning the stone slab to a remote party before the step of providing the slab image file to the remote party. The image metadata may include a color characteristic of the stone slab and the step of assigning the stone slab to a remote party may include assigning the stone slab based at least in part on the color characteristic. The method may include comparing a predetermined color characteristic to color characteristics of a plurality of slab image files stored in a database. The method may include responding to a request from the remote party for a stone slab having a predetermined characteristic. The stone slab may be a synthetic molded stone slab comprising a quartz material. The image may have a length greater than 9000 pixels. The image may have a length greater than 12000 pixels. The dimensional relationship may include a length ratio ($L_{slab}/L_{image}$) of slab length ($L_{slab}$) to image length ($L_{image}$), and the length ratio ($L_{slab}/L_{image}$) is less than 0.02 in. per pixel. The length ratio ($L_{slab}/L_{image}$) of slab length ($L_{slab}$) to image length ($L_{image}$) may be substantially the same at a peripheral edge of the slab and at a middle of the slab. The color characteristic of the image metadata may include a color rating. The image metadata may include a color characteristic unique to the associated stone slab. The image metadata may include a dimension of the associated stone slab. The remote party may be a countertop fabricator. Providing the slab image file associated with the stone slab to a remote party may occur before providing the stone slab to the remote party, after providing the stone slab to the remote party, or together with the stone slab such that the remote party receives the slab image file and the stone slab together.

Some embodiments described herein include an exemplary system for manufacturing and distributing stone slabs and corresponding images of the stone slabs. The system may include an inventory of stone slabs, and a database storing slab image files graphically representing the stone slabs in the inventory. In a preferred option, the slab image files are generated at a stone slab manufacturing site. At least a first portion of the slab image files represent a corresponding first portion of the inventory of the stone slabs, and the first portion of the slab image files may be remotely accessible by a remote user prior to the corresponding first portion of the inventory of stone slabs being accessible to the remote user.

In some implementations, the system can optionally include one or more of the following features. Preferably, each slab image file may graphically represent a major surface of a corresponding stone slab in the inventory of stone slabs, and each slab image file may include image metadata selected from the group consisting of an identifier that specifically identifies the corresponding stone slab, manufacturing information for the corresponding stone slab, a weight of the corresponding stone slab, material information for the corresponding stone slab, at least one color characteristic of the corresponding stone slab, and at least one dimensional characteristic of the corresponding stone slab. The dimensional characteristic of the corresponding stone slab may include a dimensional relationship comprising a length ratio ($L_{slab}/L_{image}$) of slab length ($L_{slab}$) to image length ($L_{image}$), and the length ratio ($L_{slab}/L_{image}$) is less than 0.4 mm per pixel. Optionally, the system may include an image generator station at the stone slab manufacturing site to generate the slab image files when the stone slabs are manufactured.

In some embodiments, a method of manufacturing and distributing stone slabs and corresponding images of the stone slabs may include manufacturing a plurality of synthetic molded stone slabs according to a predetermined pattern such that each of the plurality of synthetic molded stone slabs exhibit a similar visual appearance. The method may further include assigning a unique identifier associated with each of the plurality of stone slabs, assigning a first subset of the plurality of stone slabs to a remote party. Also, the method may include providing slab image files associated with each of the stone slabs to the remote party, and the slab image files may optionally include a medium format image of the stone slab and image metadata indicative of characteristics of respective stone slabs. The image metadata may include, for example, the unique identifier, a color characteristic of the image (which optionally may be characterized as a numeric value), and a predetermined dimensional relationship including a ratio of stone slab unit length per image pixel that is substantially consistent at any location of the image. The step of assigning the first subset of the plurality of stone slabs to the remote party may include comparing the color characteristic to color characteristics of a plurality of slab image files stored in a database. In some implementations, the step of assigning the stone slab to a remote party may occur before the step of providing the images and metadata to the remote party.

In various embodiments, a method of manufacturing and managing stone slabs may include manufacturing a plurality of synthetic molded stone slabs according to a predetermined pattern, and receiving a request from a remote party for a stone slab having the predetermined pattern and a characteristic. The method may also include identifying a stone slab having the predetermined pattern and characteristic by comparing slab image files associated with an inventory of stone slabs to the characteristic, and responding to the request by delivering the identified slab image file and associated stone slab.

In some implementations, the method can optionally include one or more of the following features. The step of receiving the request from the remote party having the predetermined pattern and characteristic may include receiving a unique identifier associated with a stone slab. Also, the step of receiving the request from the remote party may include receiving a color characteristic (which may optionally be a numeric color rating).

In some embodiments, a system for manufacturing and distributing stone slabs and corresponding images of the stone slabs may include an inventory of stone slabs assigned to a remote party. The system may also include a database storing at least a portion of stone slab image files generated during manufacture of the inventory of stone slabs. Optionally, at least a portion of the stone slab image files are accessible by the remote party before the inventory of stone slabs are accessible by the remote party.

In some implementations, the system can optionally include one or more of the following features. The stone slab image files may include image metadata indicative of characteristics of the stone slab. The slab image file may include a unique identifier and a predetermined dimensional relationship including a ratio of stone slab unit length per image pixel, the ratio substantially consistent at any location of the image. The dimensional relationship may include a length ratio ($L_{slab}/L_{image}$) of slab length ($L_{slab}$) to image length ($L_{image}$), and the length ratio ($L_{slab}/L_{image}$) is less than 0.02 in. per pixel.

Some embodiments described herein include a system for manufacturing and distributing stone slabs and corresponding images of the stone slabs. The system may include means for manufacturing a stone slab to produce an inventory of stone slabs, and means for generating stone slab image files of the inventory of stone slabs. Optionally, the system may include means for providing the stone slab image files to a remote party before the stone slabs are accessible by the remote party. The stone slab image files may include image metadata indicative of characteristics of the stone slab. For example, the image metadata may include a unique identifier and a predetermined dimensional relationship including a ratio of stone slab unit length per image pixel, the ratio substantially consistent at any location of the image. The dimensional relationship may include a length ratio ($L_{slab}/L_{image}$) of slab length ($L_{slab}$) to image length ($L_{image}$), and the length ratio ($L_{slab}/L_{image}$) is less than 0.4 mm per pixel.

Particular embodiments described herein include a system for manufacturing and distributing stone slabs and corresponding images of the stone slabs, The system may include an inventory of stone slabs, and a repository that stores at least a portion of stone slab image files generated when the stone slabs are manufactured and associated with the inventory of stone slabs. Optionally, the stone slab image files may include image metadata indicative of characteristics of the stone slab.

The systems and techniques described herein may provide one or more of the following advantages. First, some embodiments described herein include a system that generates images of stone slabs at a manufacturing location in a manner that can reduce costs and improve efficiency associated with quality control, distribution, fabrication/stone cutting, and other subsequent processes. Optionally, the system can generate and store digital images along with a set of additionally useful data as stone slabs move through an existing manufacturing line without a significant impact on the equipment and handling of the stone slabs. In another example, the system can generate and store digital images for subsequent use in quality control activities, matching or grouping of multiple stone slabs for shipment together, nesting or layout design activities by a fabricator, and/or other activities throughout the life of the stone slab.

Second, in some embodiments of the system described herein, a particular stone slab and a corresponding image (optionally, with its embedded metadata for the particular slab) may be associated with one another for the entire life of the stone slab from initial manufacture to end-use installation, increasing the number of operations in which an image (and its embedded metadata for the particular slab) can replace or enhance physical manipulation or inspection of a stone slab.

Third, in particular embodiments described below, a precise dimensional relationship between a stone slab and an associated image can be calculated and stored, for example, to facilitate reliable nesting operations and may reduce measuring or other manipulation of the physical stone slab. Further, multiple nesting and cutting operations of a single slab may be carried out using a single image generated at a time of manufacture, providing benefits in inventory management and other operations even after a portion of the stone slab has been cut or removed for a particular project. The image may be used to identify or match the remaining slab portion without requiring physical handling or additional imaging of the remaining slab portion.

Fourth, some embodiments described herein include a system that also generates image metadata associated with a stone slab that provides information, which may optionally allow an inventory of numerous stone slabs to be readily searched and cataloged without physically handling or moving the actual stone slabs. Additionally, one or more image characteristics stored as part of the image metadata may be used to group stone slabs for a particular customer or project, or to identify a particular slab from an inventory of stone slabs. Accordingly, providing each stone slab and its corresponding image (with its embedded metadata for the particular slab) provides the capabilities for additional automation of such tasks and enhances reliability in matching and selecting of a stone slab having the characteristics called for by a particular application.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

Figure 1:
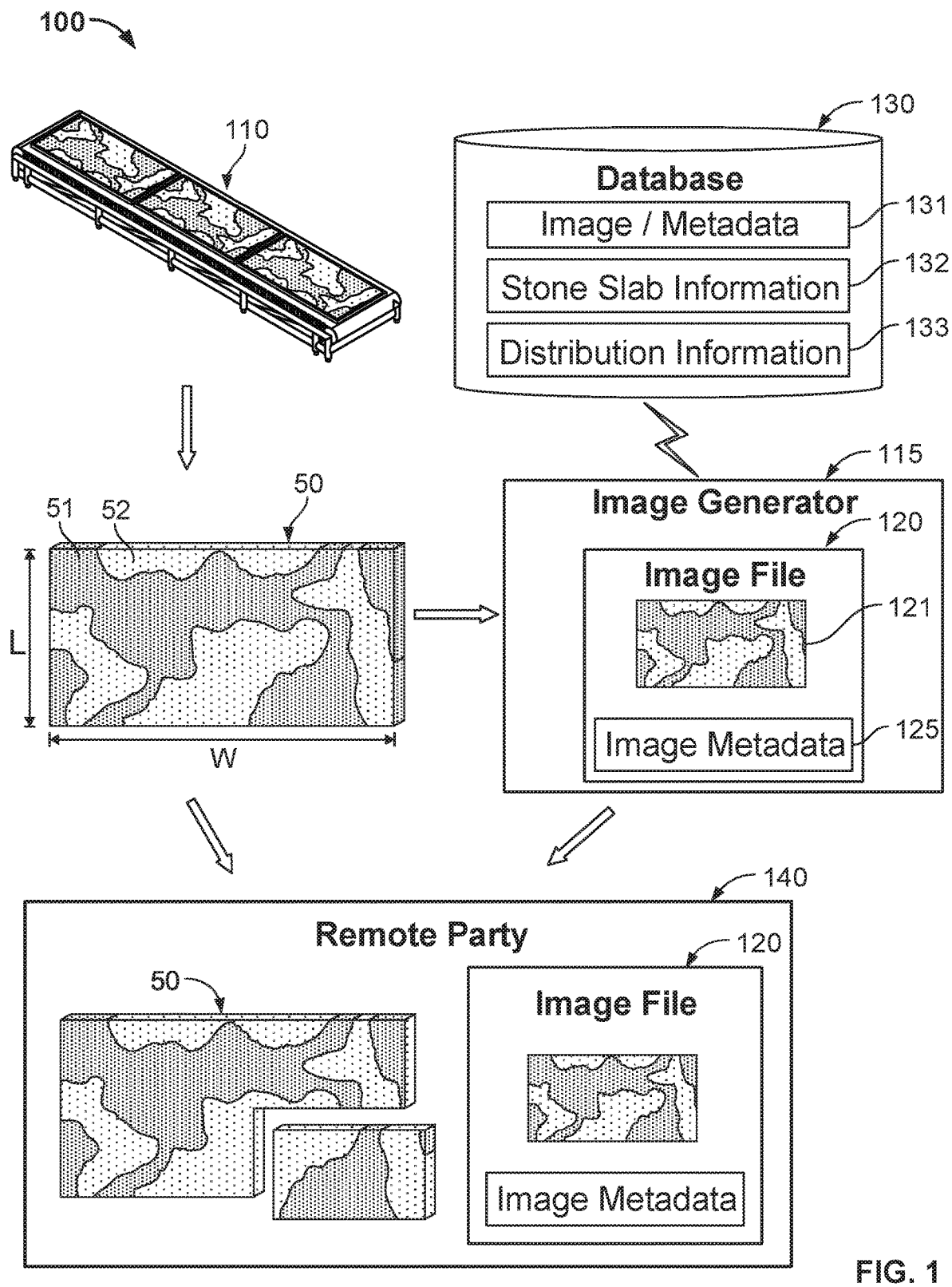
FIG. 1 is a diagram of an exemplary system used in providing stone slabs and corresponding image files of the slabs.

Referring to FIG. 1, an exemplary system 100 can be used to produce one or more stone slabs 50 and slab image files 120 associated with each stone slab 50. In this embodiment, system 100 generates a high resolution image of stone slabs 50 such that the images are available for use in one or more subsequent operations throughout the life of the stone slabs 50.

In an exemplary embodiment, system 100 includes a manufacturing line 110 including one or more stations for manufacturing stone slab 50. For example, stone slab 50 may be a synthetic molded stone slab comprising a quartz material and/or other particulate mineral material that, when mixed with pigments and a resin binder and compressed, provides a hardened slab product suitable for use in living or working spaces (e.g., along a countertop, table, floor, or the like). Manufacturing stone slab 50 may include steps of dispensing one or more particulate mineral mixes in a mold, vibrating and/or compacting the particulate mineral mixes, curing the compacted mix, polishing a major surface, and/or other operations. In other exemplary embodiments, stone slab 50 be may a quarried natural stone slab, and manufacturing line 110 may include one or more cutting, polishing and/or other operations that can be used to manufacture stone slab 50.

Stone slab 50 may be molded and/or cut to have a length L and a width W, as desired for a particular application. For example, stone slab 50 may be a relatively large slab that may be cut to specific shapes for use in living or working spaces (e.g., along a countertop, table, floor, or the like). In various exemplary embodiments, stone slab 50 is at least 3 feet wide by at least 6 feet long, for example between about 3 feet and 8 feet wide and between about 6 feet and 14 feet long, or between about 4.5 feet and 7 feet wide and between about 10 feet and 12 feet long. In some exemplary embodiments, stone slab 50 is about 7 feet wide by about 12 feet long. In other embodiments, stone slab 50 is preferably about 4.5 feet wide (approximately 140 cm wide) by about 10 feet long (approximately 310 cm long). In some exemplary embodiments, stone slab 50 may have an aesthetic effect including veins 51 and 52 that extend partly or fully across a complete length L of the stone slab 50, through the thickness T of stone slab 50, and/or positioned relative to one another based on a predetermined pattern. Such characteristics may provide a natural vein appearance even when the slab is cut and edged to specific shapes.

Stone slab 50 may proceed to an image generator station 115 resulting in a high resolution slab image file 120 of stone slab 50. In an exemplary embodiment, the image generator station 115 includes a camera (e.g., optionally, a "medium format" camera) mounted within an enclosure. Stone slabs 50 may sequentially pass into the enclosure and within the field of view of the camera to be imaged.

In some exemplary embodiments, a slab image file 120 includes a substantially distortion free image 121 and image metadata 125 associated with image 121. In embodiments in which image generator station 115 includes a medium format camera, image 121 may be a medium format image. Also in this exemplary embodiment, the image generator station 115 is present at the same manufacturing location and/or process as an initial stone slab 50 polishing station and/or other manufacturing steps. In some embodiments, the image generator station 115 is positioned after a polishing station in system 100 and prior to storing the slab for an inventory or for distribution to an offsite location. In this way, the high resolution slab image file 120 provides an electronic image 121 of stone slab 50 at the time that stone slab 50 is manufactured. In such embodiments, additional manipulation or physical movement of stone slab 50 can be reduced, and stone slab 50 is able to move through manufacturing line 110, including an image generator station 115, as part of a streamlined system 100. Image 121 and/or other information provided by slab image file 120 may then be used to facilitate and/or automate one or more inventory management, distribution, fabrication or other operations throughout the life of stone slab 50.

In an exemplary embodiment, image 121 provides a high resolution image that allows humanly perceptible characteristics of a physical stone slab 50 to similarly be observed in image 121. In various exemplary embodiments, image 121 may exhibit between about 25 megapixels and 500 megapixels, 30 megapixels and 200 megapixels, or about 40 megapixels. Image 121 may thus be used in addition, and/or as a substitute, to viewing the physical stone slab 50. Slab image file 120 may be provided as any file or file set including the image 121 and image metadata 125. (As used herein, the term "high resolution image" means a digital image of a slab having a resolution of 25 megapixels or greater. As described in more detail below, other (lower) types of resolution are also contemplated in some embodiments described herein.)

System 100 further includes, in addition to or together with the image generator station 115, a metadata generator station that generates metadata 125 associated with stone slab 50 and/or one or more images of stone slab 50. For example, the metadata 125 may include information related to stone slab 50 and/or slab image file 120 and may be generated before, after, during, or as part of, an image generator station 115. In various exemplary embodiments, metadata 125 may include information related to image 121 such as a unique identifier associating slab image file 120 with a particular stone slab 50, manufacturing information such as a time and location of manufacture, characteristics of stone slab 50 such as dimensional information, weight, materials, presence and/or location of imperfections, one or more color characteristics, including a color characteristic that may uniquely identify a particular stone slab 50, and/or a dimensional relationship between stone slab 50 and the associated image, as described in greater detail herein.

System 100 further includes one or more databases 130 storing information related to system 100. Slab image files 120 associated with stone slabs 50 and generated at an image generator station may be stored in database 130 for subsequent access, use, modification and/or distribution. For example, database 130 may include a data storage system made up of one or more repositories that together store information related to system 100. Database 130 may include one or more local databases, for example housed locally at the manufacturing location, and/or may include one or more remote databases.

In an exemplary embodiment, database 130 includes a cloud-based system that may be accessed remotely, and access to various components of database 130 selectively granted to particular users. A manufacturer and/or system administrator may have complete access to all aspects of database 130, while a remote party may be granted access only to particular content, such as particular slab image files 120 the remote party has purchased or is considering purchasing, for example.

In some exemplary embodiments, all or portions of slab image file 120 and/or metadata 125 are stored as read-only data. Such information may be permanently associated with a particular stone slab 50. For example, a unique identifier, manufacturing time, dimensional relationship(s), and/or color characteristics may be stored as read-only data. Other information, such as a purchaser of stone slab 50 and/or other information may be readily updateable throughout the life of slab image file 120, and may be selectable such that certain metadata may be included and/or viewable only by a particular user.

In addition to slab image files 120, database 130 may store other stone slab information 132 and/or distribution information 133 related to one or more remote parties. Such information may similarly be used for one or more operations related to stone slabs 50 and/or selectively distributed to one or more users.

Still referring to FIG. 1, stone slabs 50 and one or more associated slab image files 120 may subsequently be distributed to a remote party 140. For example, in a distribution operation, particular stone slabs 50 and associated slab image files 120 are assigned to remote party 140. Remote party 140 may be a purchaser of one or more stone slabs 50, or a prospective purchaser considering purchasing one or more stone slabs 50. In an exemplary embodiment, remote party 140 is a countertop fabricator that designs, cuts, and/or installs countertops in an end-use application at one or more locations remote from a manufacturing location of stone slab 50. In other exemplary embodiments, remote party 140 may be a distributor, end user, or other member of a distribution chain.

Distribution of slab image files 120 from a location of manufacturing line 110 thus allows remote party 140 to receive stone slabs 50 and slab image files 120 independent of one another. One or more stone slabs 50 may be delivered to remote party 140 before, after or simultaneously with associated slab image files 120. For example, in an exemplary distribution operation, slab image files 120 associated with stone slabs 50 assigned to remote party 140 are provided to remote party 140 before stone slabs 50 are physically provided to the remote party 140. Remote party 140 may review and/or use slab image files 120 for distribution, modeling, cutting or other operations in a time period that is hours, days or weeks in advance of physically receiving, handling and/or storing stone slab 50. In this way, remote party 140 may begin preparatory operations for a particular installation, for example, at least partly independent of stone slab 50. Upon receipt by remote party 140, stone slab 50 may be immediately cut and/or installed at a location of end-use based on plans created using slab image file 120. Storage time and handling by remote party 140 may thus be reduced, facilitating efficiency and reducing an inventory held by remote party 140.

Alternatively or in addition, slab image files 120 may be provided for review by remote party 140 before associated stone slabs are shipped. Remote party 140 may review and confirm or terminate shipment based at least in part, and/or solely, on slab image files 120. In this way, physical handling and other costs associated with denied or returned shipments may be further reduced.

In some exemplary embodiments, one or more associated stone slabs 50 and slab image files 120 may be provided together. For example, slab image files 120 may be physically delivered on a storage device with stone slabs 150. Slab image files 120 can immediately be used by the remote party in stone slab management, cutting, and/or other operations without further need to create an image or other catalog of the received stone slabs 50 at the remote party location. Cost and floor space otherwise required by an image generator station may thus be omitted and dedicated to other stations of remote party 140.

Figure 2:
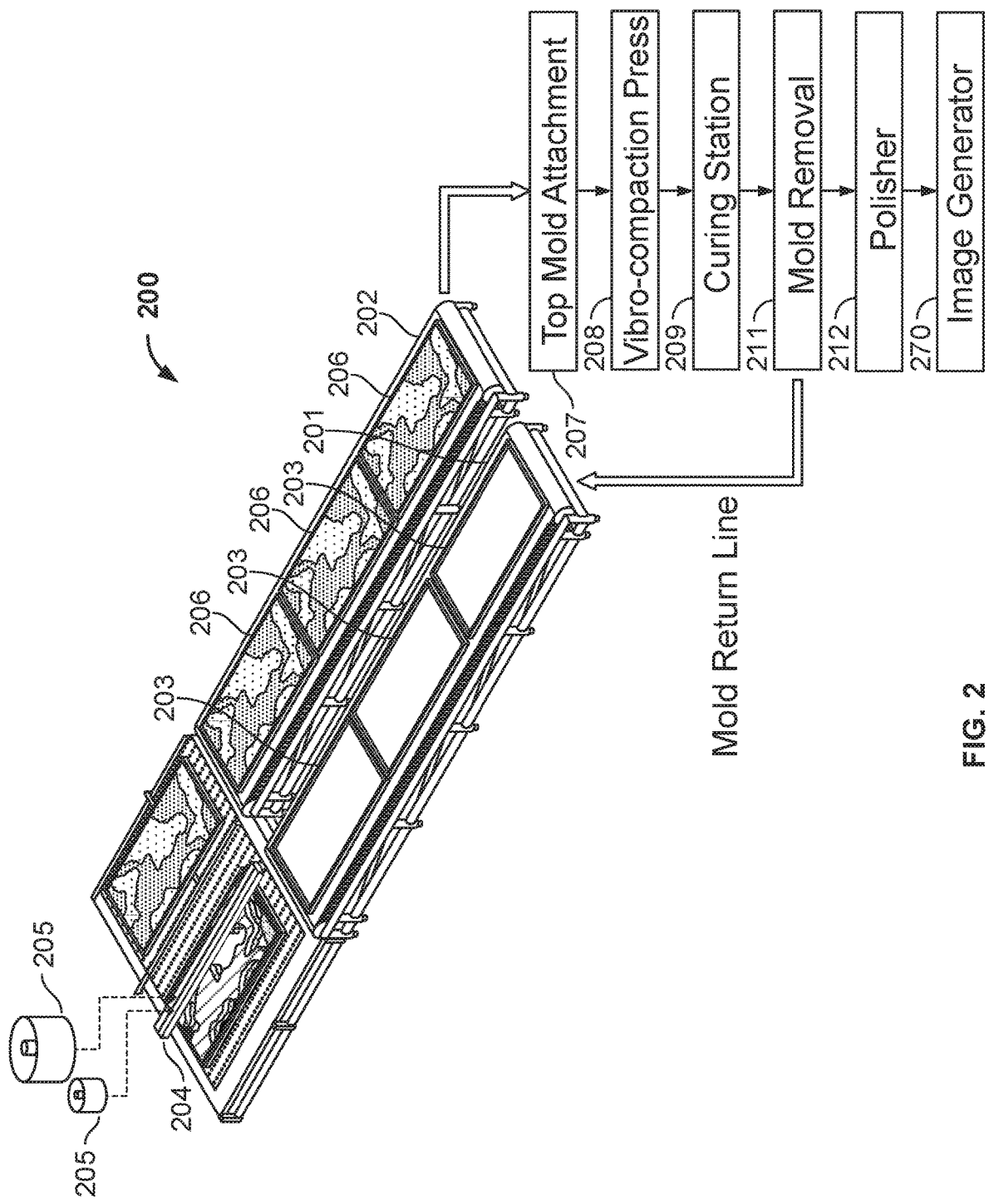
FIG. 2 is a diagram of an exemplary system of manufacturing synthetic molded stone slabs and generating corresponding image files of the slabs.

Referring to FIG. 2, an exemplary system 200 is shown that can be used to manufacture and manage an inventory of synthetic molded stone slabs 206. The synthetic molded stone slabs 206 may be imaged before distribution from the manufacturing location, as described above with system 100, for example, to generate an image file and metadata including information about an associated stone slab. Each of the synthetic molded stone slabs 206 may include a quartz material and/or other particulate mineral material that, when mixed with pigments and a resin binder and compressed, provides a hardened slab product suitable for use in living or working spaces.

In the exemplary system shown in FIG. 2, pigmented particulate mineral mixes are poured into a mold to generate a slab having a desired aesthetic appearance. For example, stone slabs may be formed from two differently pigmented particulate mineral mixes that are poured into different, designated regions of a respective mold. These designated regions are repeated for each mold in a series of molds using, for example, a set of stencil structures that can be positioned over each mold and that provide a predefined complementary and repeatable dispensation pattern for the differently pigmented particulate mineral mixes. In some exemplary embodiments, the predefined complementary and repeatable dispensation pattern for the differently pigmented particulate mineral mixes provides selected striations and veining patterns that are generally repeatable and that may result in a set of stone slabs have a similar appearance.

The different mixes used to form the stone slabs can include organic polymer(s) and an inorganic (mineral) particulate component. The inorganic (mineral) particulate component may include such components as silicon, basalt, glass, diamond, rocks, pebbles, shells, a variety of quartz containing materials, such as, for example, but not limited to: crushed quartz, sand, quartz particles, and the like, or any combination thereof. In some embodiments, one or more particulate mineral mixes each comprise a quartz material as a predominant component, which may include sand of various particle sizes and of different combinations. In the resulting stone slab, the organic and inorganic materials can be linked using a binder, which may include for example, mono-functional or multifunctional silane molecules, dendrimeric molecules, and the like, that may have the ability to bind the organic and inorganic components of the composite stone mix. The binders may further include a mixture of various components, such as initiators, hardeners, catalysators, binding molecules and bridges, or any combination thereof. Some or all of the mixes dispensed in the mold may include components that are combined in a mixing apparatus (not shown) prior to being conveyed to the mold. The mixing apparatus can be used to blend raw material (such as the quartz material, organic polymers, unsaturated polymers, and the like) at various ratios. For example, some or all of the mixes dispensed in the mold may include about 8-95% quartz aggregates to about 5-15% polymer resins. In addition, various additives, may be added to the raw materials in the mixing apparatus, such additives may include, metallic pieces (e.g., copper flecks or the like), colorants, dyes, pigments, chemical reagents, antimicrobial substances, fungicidal agents, and the like, or any combination thereof.

Still referring to the embodiment shown in FIG. 2, system 200 for forming a set of synthetic molded stone slabs sequentially dispenses one or more of the differently pigmented particulate mineral mixes into a mold which is then processed using a subsequent compression molding operation (e.g., vibro-compaction molding, curing, etc.). First, a collection of slab molds 203 are transported on an input conveyor 201 to an air table. The air table includes a collection of outlets formed on a top surface with air pumped through the outlets to form a cushion of air between the top surface and slab molds 203, to help operators move and/or orient slab molds 203.

Slab molds 203 proceed to one or more mineral aggregate distributors 204, which receives one or more particulate mineral mixes from corresponding mixers 205. In an exemplary embodiment, each of the mineral aggregate distributors 204 includes a dispensing head and is configured to reciprocate over the mold 203 as the dispenser head releases a selected particulate mineral mix into the mold 203 (or is otherwise configured to deposit the selected particulate mineral mix into the mold 203). Dispensing heads may each be configured with a shutter or valve apparatus (not shown in FIG. 2) that is controllable to regulate the flow of particulate mineral mix from dispensing head to slab mold 203 and that is controllable to dispense material into slab molds 203 at a substantially repeatable rate.

After slab mold 203 has been sufficiently filled, slab mold 203 (now a filled mold 206) is moved to an output conveyor 202. Output conveyor 202 can be configured to transport each of the filled molds 200 to one or more subsequent stations in system 200. For example, each of filled molds 206 can continue to a subsequent station in which a top mold attachment 207 is positioned over the filled mold 206 so as to encase the layers of particular mineral mixes between the mold 203 and a top cover mold piece (not shown in FIG. 2). From there, the filled mold 206 including the top cover mold piece continues to a subsequent station in which a vibro-compaction press 208 applies compaction pressure, vibration, and vacuum to the contents inside the filled mold 206, thereby converting the one or more particulate mixes into a rigid slab. After the vibro-compaction operation, filled mold 206 (with the compacted and hardened slab therein) proceeds to a curing station 209 in which the material used to form the slab (including any resin binder material) are cured via a heating or other curing process, thereby further strengthening the slab inside the filled mold 206. After the slab is fully cured and sufficiently cooled, primary mold 203 and the top mold cover piece are removed from the hardened and cured slab at a mold removal station 211. Primary mold 203 is returned to the input conveyor 201. The hardened and cured slab is moved to a polisher station 212, in which a major surface of the slab is polished to a smooth finish providing an appearance having, for example, complex striations and veining patterns. In such circumstances, the polished major surface of each of synthetic molded slabs provides an outer appearance that is generally repeatable and similar to the other slabs (e.g. from other filled molds 208 in FIG. 2).

In an exemplary embodiment, system 200 includes an image generator station 270 that can be used to generate an image associated with each stone slab manufactured by system 200. Image generating station 270 may be positioned after polisher station 212 such that a polished slab can readily proceed to image generating station 270. In an exemplary embodiment, image generating station 270 generates a high resolution, medium format image associated with each stone slab. As described above with reference to FIG. 1, the resulting images may be stored as image files including associated metadata that may be used in inventory management, quality assurance, stone slab selection and matching, and fabrication operations, for example, as described in greater detail herein.

Figure 3:
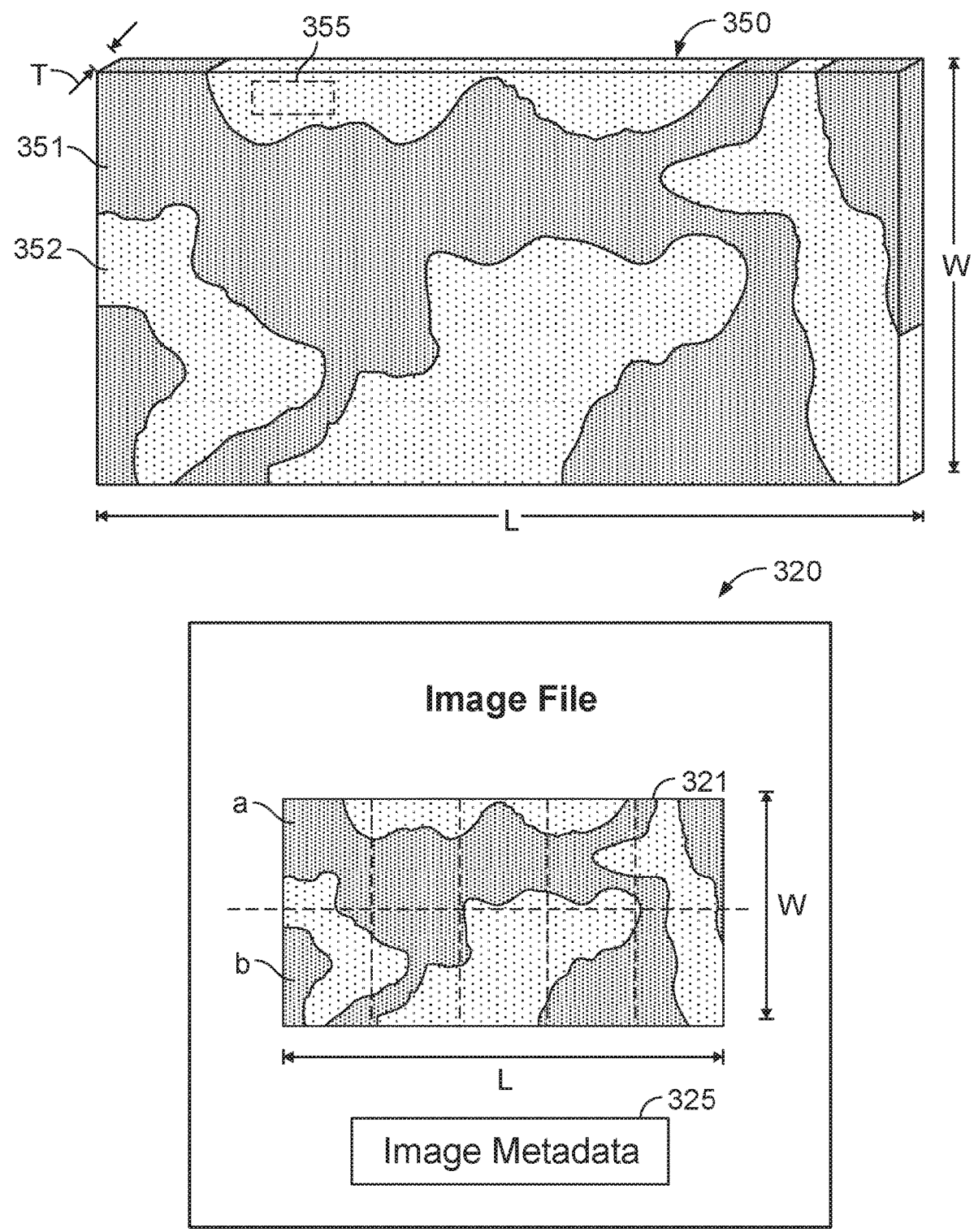
FIG. 3 is a diagram of an exemplary stone slab and associated image file.

Referring to FIG. 3, an exemplary stone slab 350 and associated slab image file 320 are shown. Stone slab 350 may be a synthetic manufactured stone slab, quarried slab or other stone slab 350, and associated slab image file 320 provides a high resolution image 321 and image metadata 325 related to stone slab 350. Stone slab 350 exhibits a variety of features and characteristics, for example resulting from a manufacturing process, and slab image file 320 may include a substantially distortion free, high resolution, medium format image 321 and image metadata related to such features and characteristics.

As described above regarding system 100, image metadata 325 may include data related to stone slab 350 such as, for example, a unique identifier associating slab image file 320 with a particular stone slab 350, time and location of manufacture, dimensional information, weight, presence and/or location of imperfections, one or more color characteristics, and/or other data.

In an exemplary embodiment, image metadata 325 includes a unique identifier that allows association between a particular stone slab 350 and an associated slab image file 320. The unique identifier may include a unique number, code or other identifier that uniquely identifies a single stone slab 350 from one or more other stone slabs 350.

Stone slab 350 is tagged with the unique identifier and/or additional information related to stone slab 350. In an exemplary embodiment, a label 355 is provided on stone slab 350 that includes the unique identifier in a computer-readable and/or human readable format. The label may include a barcode, RFID tag, QR code, etching or writing directly on the stone slab, and/or other identifier. In some exemplary embodiments, the label may be an RFID tag that is embedded in the stone slab such that the tag is not visually perceptible (e.g. when stone slab is installed) but may communicate the unique identifier and/or other information when interacted with by an appropriate reader, such as a scanner or RFID tag reader. The unique identifier may be used throughout the life of the associated stone slab to associate the stone slab with an image and/or other information related to stone slab 50.

Still referring to FIG. 3, stone slab 350 and image 321 may exhibit a dimensional relationship such that image 321 and/or metadata 325 provides accurate information related to one or more dimensional characteristics of stone slab 350. In an exemplary embodiment, stone slab 350 exhibits various dimensions including a width W and Length L resulting from a molding and/or cutting operation. Stone slab 350 may also have an aesthetic effect such as veins 351 and 352 that extend partly or fully across a complete length L of stone slab 350 that may be characterized by particular dimensions and spacing. For example, such aesthetic effects may be positioned relative to one another based on a predetermined pattern, and may be similar among a set of stone slabs 350.

Image 321 provides a dimensionally accurate representation of stone slab 350 that both accurately represents relative positioning of edges, veins and/or other features within the slab image, and allows accurate determination of absolute distances between edges and/or such features. Such dimensional accuracy allows image 321 to be used in selecting and matching operations, and in nesting operations in which stone slab 350 is divided into portions having desired sizes and characteristics for a particular installation. For example, image 321 may be substantially distortion free such that relative positioning of various aesthetic features depicted by image 321 is consistent with stone slab 350.

In an exemplary embodiment, one or more images 321 have a predetermined dimensional relationship with stone slabs 350, such as a consistent ratio of stone slab unit length per image pixel. For example, one or more images 321 may exhibit a ratio of stone slab unit length per image pixel having a desired value. In various exemplary embodiments, a length ratio ($L_{slab}/L_{image}$) of slab length ($L_{slab}$) to image length ($L_{image}$) may be less than 0.02 in. per pixel, less than 0.018 in. per pixel, less than 0.016 in. per pixel, less than 0.014 in. per pixel, less than 0.012 in. per pixel, or less than 0.01 in. per pixel. For example, a length ratio of ($L_{slab}/L_{image}$) may be between 0.005 in. per pixel to 0.02 in. per pixel, 0.01 in. per pixel to 0.018 in. per pixel, or about 0.014 in. per pixel.

In an exemplary embodiment, image 321 is substantially distortion free such that the length ratio ($L_{slab}/L_{image}$) of unit slab length to image length is substantially consistent at any location of image 321. For example, a particular length of image 321 corresponds to a consistent length of stone slab 350, irrespective of whether the length is at a peripheral edge, middle, or other location of image 321. Image 321 thus provides a reliable tool for measuring and cutting stone slab 350. Nesting layouts in which veins, coloring and/or imperfections are intended to be included or avoided in a cut portion or seam, for example, can be prepared using image 321 and reliably applied to stone slab 350.

Furthermore, such dimensional accuracy allows image 321 to be reused through the life of any remaining portion of stone slab 350. For example, after stone slab 350 is cut to remove a portion having a desired size, dimensions of the removed portion and/or remaining slab may be accurately depicted using image 321. Image 321 can thus be reused in subsequent cutting or other operations without a need to generate a new image from the physical partial slab.

In an exemplary embodiment, image metadata 325 includes dimensional information related to stone slab 350 described above. For example, image metadata 325 may include width, length, thickness and/or other dimensions of stone slab 350, width, length, thickness and/or other dimensions of image 321, and/or one or more further dimensional relationships between stone slab 350 and image 321, such as the length ratio ($L_{slab}/L_{image}$) of slab length ($L_{slab}$) to image length ($L_{image}$). Image 321 and image metadata 325 including dimensional information may thus be used together in one or more operations of stone slab 350. A high degree of dimensional accuracy and a predetermined dimensional relationship between image 321 and stone slab 350 allow stone slab to be accurately mapped and cut. Nesting and/or other operations may thus be performed with limited or no physical reference to stone slab 350.

Still referring to FIG. 3, image 321 and metadata 325 of slab image file 320 include information related to one or more color characteristics of associated stone slab 350. The visual appearance of stone lab 350 is affected significantly by the colors of its major surfaces, and particularly the colors of one or more veins, patterns, or other features. Color thus plays a major role in the aesthetic impression stone slab 350 provides to a viewer, and affects how portions of multiple stone slabs 350 may be suitably grouped, positioned, and/or seamed, for example, when one or more stone slabs 350 are prepared for installation. In an exemplary embodiment, image 321 provides an accurate color representation of such features of stone slab 350, and image metadata 325 includes information related to one or more color characteristics of stone slab 350.

In various exemplary embodiments, image metadata 325 may include one or more color characteristics related to a color of stone slab 350. For example, image metadata 325 may include a color characteristic including a numeric value representative of one or more of color intensity, uniformity and/or tonality. A color characteristic including a numeric value may be generated using a color measurement and analysis technique. In an exemplary embodiment, a numeric value is generated using L*a*b* values. For example, L*a*b* values may be generated for some or all locations and/or pixels of slab image 121 to provide an indicator of various color characteristics of stone slab 50, including veining, flow, movement, distribution of particulate material, etc. useful in subsequent operations related to stone slab 50.

In an exemplary embodiment, image metadata 325 may include a numeric color characteristic based at least in part on color characteristics associated with one or more regions of slab image 321. For example, slab image 321 may be divided into imaginary regions (such as an array/matrix of regions (a), (b), etc.), and numeric color values generated for each region. Image metadata 325 may thus include one or more location-specific color characteristics, in addition to one or more values representative of an overall color characteristic of stone slab 350.

Alternatively or in addition, image metadata 325 may include one or more numeric color characteristic values, such as a slab color rating, representative of an overall color characteristic of stone slab 350 and/or a combination of local color characteristic values. For example, image metadata 325 may provide a numeric color rating that provides an overall indicator of color and that may be compared to color ratings associated with other stone slabs 350. That is, an exemplary numeric color rating may provide an indicator of how a particular stone slab 350 appears as compared to other stone slabs 350 having a similar style and/or predetermined pattern. Accordingly, a set of stone slabs 350 of a particular style having similar color ratings may be characterized as having a similar visual color appearance, while stone slabs 350 of a particular style having different color ratings may be characterized as exhibiting relatively different visual appearances. In this way, a single numeric color characteristic value included as image metadata 325, alone or in combination with one or more items of information of slab image file 320, may be used to quickly qualify, group, match, and/or select a specific stone slabs 50.

In some embodiments, image metadata 325 may include one or more color characteristic values that are unique to image 321 and/or associated stone slab 350. That is, an exemplary color characteristic may result in a numeric value or array of values representative of color values at one or more locations of stone slab 350 that provides a unique color signature. For example, a unique numeric value may result from compiling color characteristics at various locations of slab image 321 to provide both color information useful in subsequent operations and a numeric value that uniquely identifies stone slab 350 based on color characteristics of that particular stone slab 350.

In various exemplary embodiments, image metadata 325 may include additional information related to an appearance of stone slab 350. For example, image metadata 325 may include one or more defect identifiers providing a location and/or other information regarding one or more defects. Alternatively or in addition, image metadata 325 may include information related to surface properties of stone slab 350, such as information related to surface polish, scratches, gloss, etc. In some exemplary embodiments, image metadata 325 includes gloss values across stone slab 350 that may be used to determine appropriate seam placement.

Figure 4:
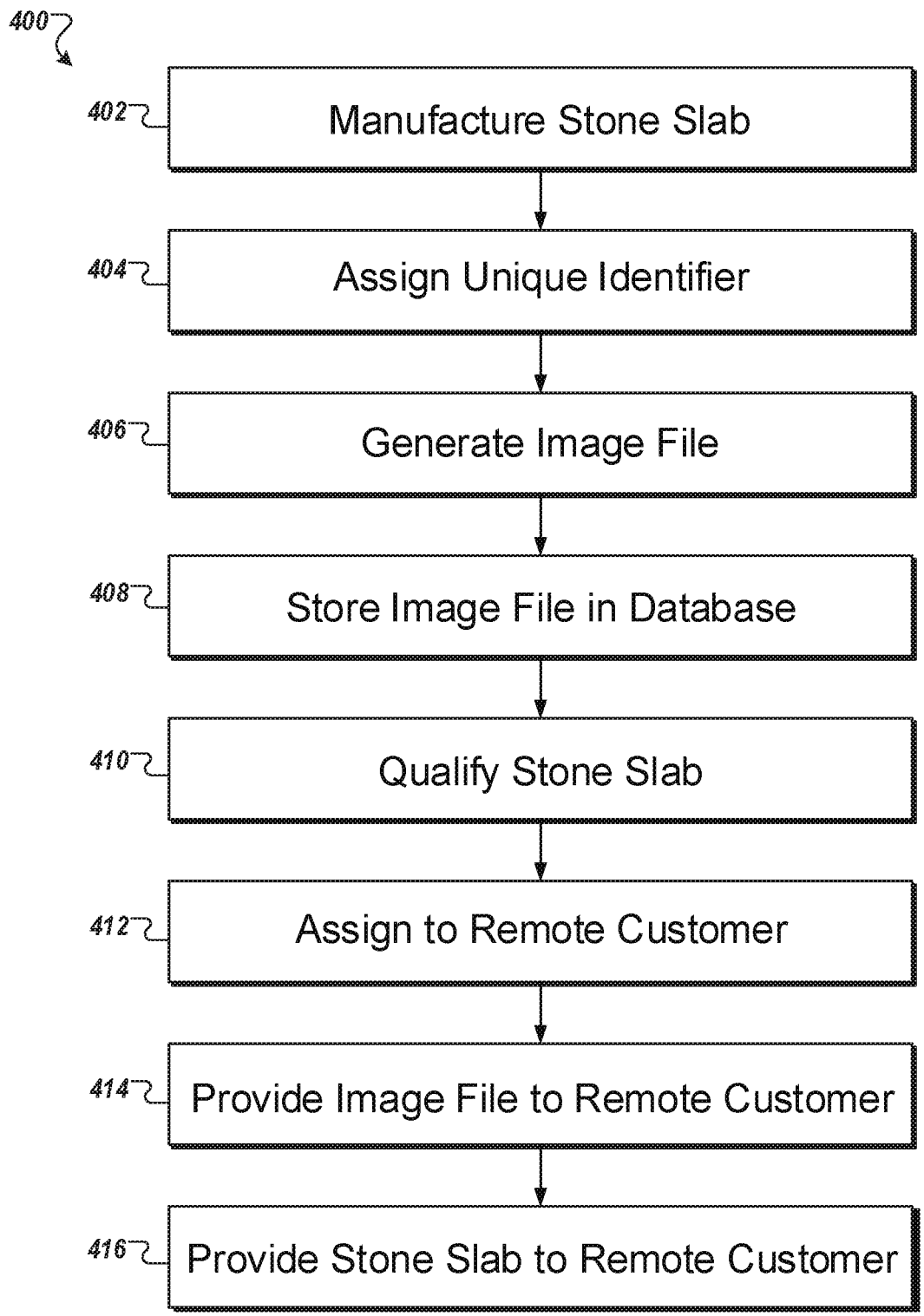
FIG. 4 is a flow diagram of an exemplary process of providing stone slabs and corresponding image files of the slabs.

Referring to FIG. 4, a flow diagram of an exemplary process 400 for manufacturing and managing a stone slab is shown, including providing a slab image file generated at a manufacturing location to a remote party for use in one or more operations related to the stone slab. In an exemplary embodiment, process 400 first includes operation 402 of manufacturing the stone slab, such as stone slab 50 described herein. Manufacturing the stone slab may include steps of dispensing one or more particulate mineral mixes in a mold, vibrating and/or compacting the particulate mineral mixes, curing the compacted mix, and/or polishing a major surface of the resulting stone slab. Alternatively, the stone slab may be a quarried natural stone slab that is cut and/or polished during operation 402.

Process 400 further includes operation 404 of assigning a unique identifier associated with the stone slab. The unique identifier may include a unique number, code or other identifier that uniquely identifies a single stone slab from one or more other stone slabs. In some exemplary embodiments, operation 404 of assigning a unique identifier may include tagging the stone slab with the unique identifier, for example by affixing a label, barcode, tag, etching or writing on the stone slab, or other technique.

In an exemplary embodiment, process 400 includes operation 406 of generating a slab image file associated with the stone slab manufactured in manufacturing operation 402. As described herein, operation 406 may include generating a high resolution image, such as a high resolution "medium format" image, for example, of the stone slab and/or generating image metadata including information related to the stone slab and image. In an exemplary embodiment, operation 406 of generating a slab image file is performed at the same location, and in some embodiments, at the same manufacturing line, as operation 402 of manufacturing the stone slab. For example, a stone slab may proceed from a polishing line to an image generator, as described above with reference to system 100, such that less physical handling and other manipulation is required to position the stone slab for imaging.

Exemplary process 400 further includes operation 408 of storing a slab image file in a database. For example, one or more slab image files generated in operation 406 may be transferred to or otherwise stored in a database for subsequent access, use, modification and/or distribution. Operation 408 may include steps of storing the slab image file to a cloud-based database system and/or grouping the slab image files according to one or more features and characteristics stored as image metadata.

In various exemplary embodiments, operation 406 of generating a slab image file results in an image and image metadata associated with a particular stone slab that can streamline and/or automate various subsequent operations before stone slabs are delivered to a remote party. For example, the slab image file may be used in operation 410 of qualifying stone slabs produced during manufacturing operation 402. Qualifying operation 410 may include confirming the absence of defects and/or ensuring features and characteristics of a stone slab are within a predetermined acceptable range using the slab image file generated in operation 406. For example, one or more numeric dimensional, color characteristic and/or other characteristics stored as image metadata may be compared to a predetermined acceptable characteristic value or range of values, and the stone slab qualified and/or sorted for subsequent operations based on the one or more numeric characteristics.

Operation 410 of qualifying a stone slab may further include grouping a stone slab with one or more other stone slabs exhibiting similar features and characteristics. For example, a stone slab having a dimensional, color and/or other characteristic within a particular range may be assigned to a first group of stone slabs, and a stone slab having a color characteristic value within a different range may be assigned to a second group of stone slabs. A slab image file storing the color characteristic value thus allows grouping of stone slabs without extensive human review of either the physical stone slab or an image. Qualifying an inventory of stone slabs into one or more groups having a similar characteristic facilitates efficient management and distribution of stone slabs, as described herein.

Still referring to FIG. 4, process 400 includes operation 412 of assigning one or more stone slabs to a remote party. Stone slabs may be assigned in preparation of delivery and/or in response to an order placement or other request from a remote party. In an exemplary embodiment, stone slabs are assigned to a remote party at least in part using image metadata of a slab image file. For example, a set of stone slabs may be assigned to the remote party from a set of stone slabs previously grouped based on one or more characteristics stored as image metadata. Alternatively or in addition, the slab image file may be used to identify a stone slab having a similar dimensional, color and/or other characteristic in response to a request for a particular style. Stone slabs having one or more similar characteristics may thus be identified and assigned with little or no human review of the stone slab or image based at least in part on an image and/or metadata generated at the location of manufacturing operation 402.

At operations 414 and 416, slab image files and associated stone slabs are provided to a remote party. Slab image files and stone slabs may be provided to the remote party in any sequence. In an exemplary embodiment, one or more slab image files are provided to a remote party in advance of delivery of associated stone slabs. Accordingly, the remote party may review and/or use the slab image files while the physical stone slab remains in a remote location. Further, the slab image file may allow the remote party to confirm or cancel delivery, begin preparing layouts in a nesting operation, and/or make other decisions regarding associated stone slabs before stone slabs have left a manufacturing or storage facility. Alternatively, or in addition, slab image files and stone slabs may be provided to the remote party substantially simultaneously. When received by the remote party, a fabrication operation, for example, may be initiated immediately by using the associated slab image files, while additional processing steps of inspecting, cataloging, and/or imaging the received stone slabs at the remote party location are reduced.

Operation 414 of providing slab image files to a remote party may include one or more steps of making slab image files available to a remote party. In an exemplary embodiment, providing slab image files to a remote party includes assigning an identifier, such as a customer identifier, lot identifier, order identifier, etc. to one or more slab image files associated with stone slabs to be provided to the remote party. Slab image files associated with the identifier may then be stored in a database or other repository accessible by the remote party to view, download, use and/or otherwise access such slab image files. In this embodiment, slab image files are accessible by a particular remote party, and are not accessible by other remote parties to which the stone slabs are not assigned. Slab image files of the actual stone slabs, rather than merely representative images, are thus made available to the remote party. Alternatively or in addition, associated slab image files may be directly transferred to the remote party, for example by electronic distribution and/or physical delivery of a storage medium containing the one or more slab image files.

Figure 5:
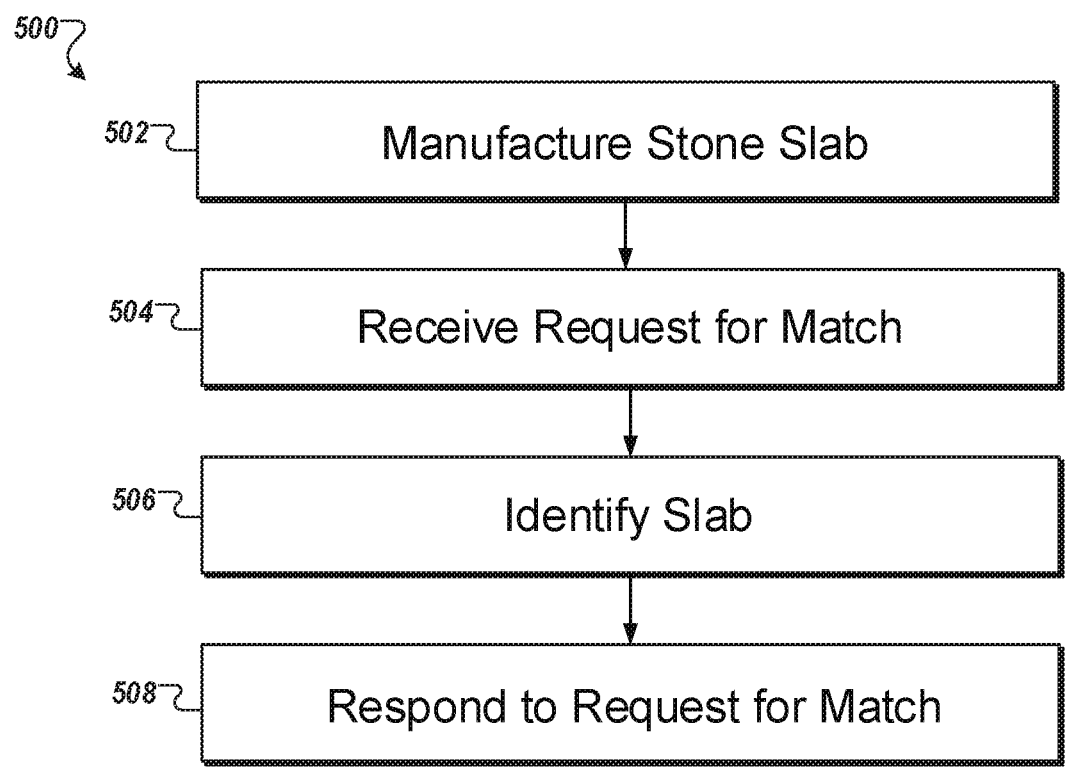
FIG. 5 is a flow diagram of an exemplary process of identifying stone slabs using an image file.

Referring to FIG. 5, a flow diagram of an exemplary process of delivering a stone slab based on a request from a remote party is shown. Process 500 may include one or more steps related to providing a stone slab to a remote party based at least in part on information stored in a slab image file. In this way, information obtained from a slab image file may be used to identify and provide stone slabs that exhibit particular dimensional, color and/or other characteristics, in addition to a particular style and/or predetermined pattern.

In an exemplary embodiment, operation 504 includes receiving a request from the remote party. Operation 504 of receiving a request may include receiving a request for a matching stone slab and/or receiving one or more items of information related to a requested dimensional, color, or other characteristic of a stone slab. In some exemplary embodiments, receiving the request may include receiving a unique identifier of a stone slab previously provided to the remote party or in the remote party's existing inventory. The unique identifier may be used to identify the previously delivered stone slab and its characteristics. Alternatively or in addition, receiving a request may include receiving a dimensional, color, and/or other characteristic to be matched, in addition to a predetermined style or pattern of the stone slab. Accordingly, a remote party may request not only a stone slab having a particular predetermined style or pattern, but also request a stone slab that exhibits certain characteristics that closely match one or more other stone slabs having the predetermined style or pattern.

At operation 508, one or more stone slabs having one or more characteristics consistent with the received request are identified using slab image files associated with an inventory of stone slabs. In an exemplary embodiment, operation 508 may include steps of identifying a desired dimensional, color and/or other characteristic based at least in part on the received request, comparing the characteristic to image metadata of an inventory of slab image files stored in a database, and identifying one or more stone slabs that satisfy the received request. At operation 510, a response is provided to the remote party, and may include steps of providing one or more slab image files and associated stone slabs to the remote party, as described above regarding process 400, for example.

In an exemplary embodiment, process 500 allows a manufacturer to provide a customer or other party with multiple stone slabs having consistent dimensional, color and/or other characteristics. The remote party is able to receive one or more stone slabs that are highly compatible with one another and/or one or more stone slabs in its existing inventory. The remote party may thus be able to carry a relatively smaller inventory while being able to closely match stone slabs in fabrication operations.

Figure 6:
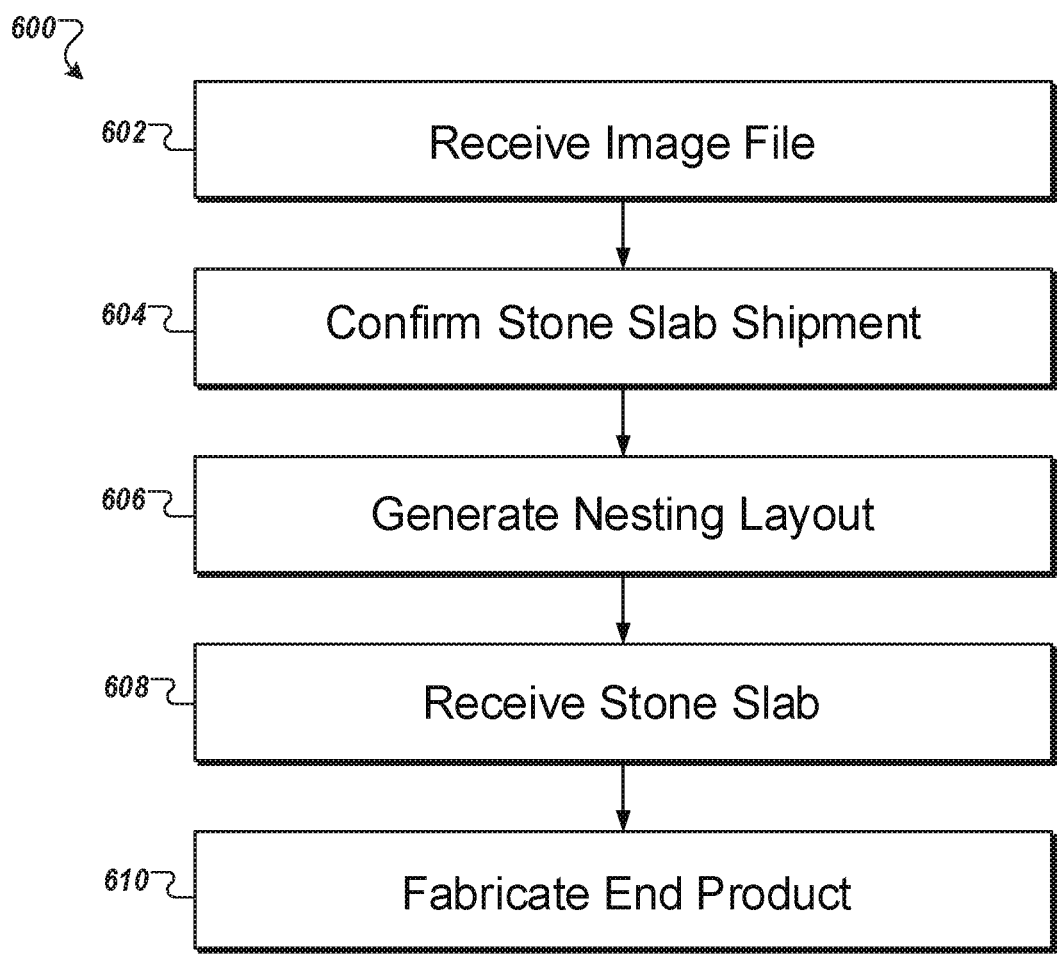
FIG. 6 is a flow diagram of an exemplary process of receiving and using an image file of a stone slab and the corresponding stone slab.

Referring to FIG. 6, an exemplary process 600 for receiving and using a slab image file by a remote party is shown. The remote party, such as a countertop fabricator, distributer, or the like, may receive and use one or more slab image files as described herein to efficiently manage a shipment and/or inventory of one or more stone slabs. In an exemplary embodiment, process 600 allows the remote party to receive and use one or more slab image files before receiving associated stone slabs. At operation 602, a remote party receives a slab image file from a stone slab manufacturer or distributor, for example, containing a high resolution and substantially distortion free image and image metadata related to an associated stone slab. The remote party thus receives detailed information regarding one or more stone slabs with reduced or no delivery costs and/or physical handling, and the information allows initiation of one or more operations before receiving associated stone slabs.

For example, at operation 604, the remote party may perform one or more steps related to confirming a stone slab shipment by reviewing the image and/or image metadata. Operation 604 may include on or more steps of confirming the slab image files are associated with desired stone slabs, exhibit desired dimensional, color and/or other characteristics, are free from defects, and/or are otherwise acceptable. In some exemplary embodiments, the remote party may accept or decline delivery of one or more stone slabs based on inspection of the slab image files, and in some exemplary processes, accept or decline delivery before the stone slabs have left a manufacturing or distribution facility.

In various exemplary processes, the remote party may use one or more slab image files received at operation 602 in one or more subsequent operations before delivery of associated stone slabs. At operation 606, slab image file may be used in a nesting layout to divide associated stone slabs into portions for a countertop or other installation, and the operation may be reliably performed using the slab image file containing a substantially distortion free, high resolution image and image metadata including one or more dimensional, color, or other characteristics. The slab image files thus allow such operations to be carried out before receiving the stone slab and while reducing floor space and physical exertion associated with such operations.

In an exemplary embodiment, the remote party receives stone slab at operation 608, which may immediately be cut and/or otherwise manipulated at operation 610 based on preparations made during operation 606. Accordingly, some or all operations of the remote party may be facilitated using slab image files in advance of receiving associated stone slabs. In various other exemplary embodiments, stone slab may be received together or in advance of an associated slab image file, and the slab image file may be advantageously used when received in addition to or as an alternative to the stone slab.

While this specification contains many specific implementation details, these should not be construed as limitations on the scope of any invention or of what may be claimed, but rather as descriptions of features that may be specific to particular embodiments. Certain features that are described in this specification in the context of separate embodiments can also be implemented in combination in a single embodiment in part or in whole. Conversely, various features that are described in the context of a single embodiment can also be implemented in multiple embodiments separately or in any subcombination. Moreover, although features may be described herein as acting in certain combinations and/or initially claimed as such, one or more features from a claimed combination can in some cases be excised separate from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of manufacturing and distributing stone slabs and corresponding images of the stone slabs, comprising:
   manufacturing a stone slab, the stone slab having a stone slab length and a stone slab width;
   assigning a unique identifier associated with the stone slab; and
   storing a slab image file associated with the stone slab, the slab image file comprising an image of the stone slab and image metadata indicative of characteristics of the stone slab, the image having an image length and an image width;
   wherein the image metadata of the slab image file comprises the unique identifier and a predetermined dimensional relationship including a numeric ratio of the stone slab length to the image length ($L_{slab}/L_{image}$), the ratio substantially consistent at any location of the image.

2. The method of claim 1, comprising providing the slab image file to a remote party.

3. The method of claim 2, comprising providing the stone slab to the remote party.

4. The method of claim 2, comprising assigning the stone slab to the remote party, wherein providing the slab image file occurs after the step of assigning the stone slab to the remote party.

5. The method of claim 3, wherein the image of the slab image file is a medium format, high resolution image having a resolution of at least 25 megapixels.

6. The method of claim 5, wherein the remote party is a countertop fabricator.

7. The method of claim 1, wherein the image metadata of the slab image file comprises a numeric color rating of the stone slab.

8. The method of claim 7, further comprising comparing a numeric color rating to numeric color ratings of the image metadata of a plurality of slab image files.

9. The method of claim 1, wherein the stone slab is a quarried stone slab.

10. The method of claim 9, wherein the manufacturing step comprises polishing the quarried stone slab.

11. The method of claim 1, wherein the stone slab is a processed stone slab.

12. The method of claim 1, wherein the stone slab has a length between 3 feet and 12 feet and a width between 3 feet and 8 feet, and the numeric ratio of stone slab length to image length ($L_{slab}/L_{image}$) is less than 0.02 inches per pixel.

13. The method of claim 1, wherein the stone slab is a partial stone slab.

14. A method of distributing stone slabs and corresponding images of the stone slabs, comprising:
    storing a stone slab in an inventory of stone slabs, the stone slab having a stone slab length and a stone slab width;
    assigning a unique identifier associated with the stone slab; and
    storing a slab image file associated with the stone slab in a database, the slab image file comprising an image of the major surface of the stone slab and image metadata indicative of characteristics of the stone slab, the image having an image length and an image width;
    wherein the image metadata of the slab image file comprises the unique identifier and a predetermined dimensional relationship including a numeric ratio of stone slab length per image pixel, the ratio substantially consistent at any location of the image; and
    wherein the dimensional relationship comprises a length ratio ($L_{slab}/L_{image}$) of slab length ($L_{slab}$) to image length ($L_{image}$), and the length ratio ($L_{slab}/L_{image}$) is less than 0.02 in. per pixel.

15. The method of claim 14, wherein a length ratio ($L_{slab}/L_{image}$) of slab length ($L_{slab}$) to image length ($L_{image}$) is substantially the same at a peripheral edge of the slab and at a middle of the slab.

16. The method of claim 14, wherein the image metadata includes a color characteristic of the stone slab, and the color characteristic of the image metadata comprises a numeric color rating.

17. The method of claim 16, wherein the color characteristic is unique to the associated stone slab.

18. The method of claim 14, wherein the image metadata further comprises a dimension of the associated stone slab.

19. The method of claim 14, wherein the stone slab is a quarried stone slab.

20. The method of claim 14, wherein the stone slab is a processed stone slab.

21. The method of claim 2, wherein providing the slab image file to the remote party comprises providing download access of the slab image file to the remote party.

22. The method of claim 2, wherein providing the slab image file to the remote party comprises electronically distributing the slab image file to the remote party.

23. The method of claim 2, wherein providing the slab image file to the remote party comprises physically delivering to the remote party a storage medium containing the slab image file.

* * * * *